US012563447B2

(12) United States Patent
Filippou et al.

(10) Patent No.: US 12,563,447 B2
(45) Date of Patent: Feb. 24, 2026

(54) AI-BASED CELLULAR NETWORK MANAGEMENT AND ORCHESTRATION

(71) Applicant: Intel Corporation, Santa Clara, CA (US)

(72) Inventors: Miltiadis Filippou, Munich (DE); Leonardo Gomes Baltar, Munich (DE); Markus Dominik Mueck, Unterhaching (DE); Kilian Peter Anton Roth, Munich (DE)

(73) Assignee: Intel Corporation, Santa Clara, CA (US)

( * ) Notice: Subject to any disclaimer, the term of this patent is extended or adjusted under 35 U.S.C. 154(b) by 445 days.

(21) Appl. No.: 17/928,392

(22) PCT Filed: Jul. 28, 2021

(86) PCT No.: PCT/US2021/043409
§ 371 (c)(1),
(2) Date: Nov. 29, 2022

(87) PCT Pub. No.: WO2022/026522
PCT Pub. Date: Feb. 3, 2022

(65) Prior Publication Data
US 2023/0199562 A1     Jun. 22, 2023

Related U.S. Application Data

(60) Provisional application No. 63/058,877, filed on Jul. 30, 2020, provisional application No. 63/057,687, filed on Jul. 28, 2020.

(51) Int. Cl.
*H04W 48/08*     (2009.01)
*H04W 28/08*     (2023.01)

(52) U.S. Cl.
CPC ... *H04W 28/0925* (2020.05); *H04W 28/0835* (2020.05); *H04W 28/0967* (2020.05); *H04W 48/08* (2013.01)

(58) Field of Classification Search
CPC ............. H04W 28/0925; H04W 48/08; H04W 28/0835; H04W 28/0967; H04W 24/02
See application file for complete search history.

(56) References Cited

U.S. PATENT DOCUMENTS

2017/0295070 A1     10/2017   Yang et al.
2018/0248904 A1     8/2018    Villella et al.
(Continued)

FOREIGN PATENT DOCUMENTS

WO     WO-2020121084 A1     6/2020
WO     WO-2022026522 A1     2/2022

OTHER PUBLICATIONS

"International Application Serial No. PCT/US2021/043409, International Search Report mailed Jan. 5, 2022", 5 pgs.
(Continued)

*Primary Examiner* — Anez C Ebrahim
(74) *Attorney, Agent, or Firm* — Schwegman Lundberg & Woessner, P.A.

(57) ABSTRACT

An apparatus and system to enable MNO policy-driven AI decisions and frame structure are described. An AI SAP receives modified context information within a network and determines a response to network events based on MNO policies. The AI SAP includes a context-aware management entity that tracks and updates the context information, a cognition framework entity that processes new data, applies inferences and compares results of the inferences to available knowledge, a situational awareness entity that determines effects of events within the system on objectives based on the MNO policies, and a policy management entity that provides behavioral rules on the system based on the
(Continued)

MNO policies. The AI SAP provides QoS modifications based on positional and movement information of a UE by determining timing indicating when the UE is to be within the AP range and adjusting AP activation and synchronization signaling for the UE based on the timing.

20 Claims, 14 Drawing Sheets

(56) References Cited

U.S. PATENT DOCUMENTS

| | | | |
|---|---|---|---|
| 2019/0182749 A1* | 6/2019 | Breaux | H04W 4/027 |
| 2019/0364399 A1 | 11/2019 | Furuichi | |
| 2019/0380092 A1 | 12/2019 | Buck et al. | |
| 2020/0118010 A1* | 4/2020 | Lee | G06N 5/025 |
| 2020/0266850 A1* | 8/2020 | Eaton | H04W 48/16 |
| 2020/0382968 A1* | 12/2020 | Gupta | H04L 41/145 |

OTHER PUBLICATIONS

"International Application Serial No. PCT/US2021/043409, Invitation to Pay Additional Fees mailed Nov. 1, 2021", 7 pgs.
"International Application Serial No. PCT/US2021/043409, Written Opinion mailed Jan. 5, 2022", 6 pgs.

\* cited by examiner

*1200*

*1202*
PREDICT UE COVERAGE ENTRY TIME

*1204*
INSTRUCT UE TO SCAN
AT PREDICTED TIME

*1206*
INSTRUCT AP TO ADD SYNC SEQUENCES
TO PHY FRAME AT PREDICTED TIME

*1300*

*1302*
RECEIVE UE PREDICTIVE TIMING

*1304*
ACTIVATE AP AT PREDICTED TIME

AI-BASED CELLULAR NETWORK MANAGEMENT AND ORCHESTRATION

PRIORITY CLAIM

This application is a U.S. National Stage Filing under 35 U.S.C. 371 from International Application No. PCT/US2021/043409, filed Jul. 28, 2021 and published in English as WO 2022/026522 on Feb. 3, 2022, which claims the benefit of priority to U.S. Provisional Patent Application Ser. No. 63/057,687, filed, Jul. 28, 2020, and U.S. Provisional Patent Application Ser. No. 63/058,877, filed, Jul. 30, 2020, each of which is incorporated herein by reference in its entirety.

TECHNICAL FIELD

Embodiments pertain to sixth generation (6G) wireless communications. In particular, some embodiments relate to application of artificial intelligence (AI) to wireless networks.

BACKGROUND

The use and complexity of wireless systems, which include $4^{th}$ generation (4G) and $5^{th}$ generation (5G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR) systems. As expected, a number of issues abound with the advent of any new technology, which will become even more complicated as $6^{th}$ generation (6G) networks start to be developed.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
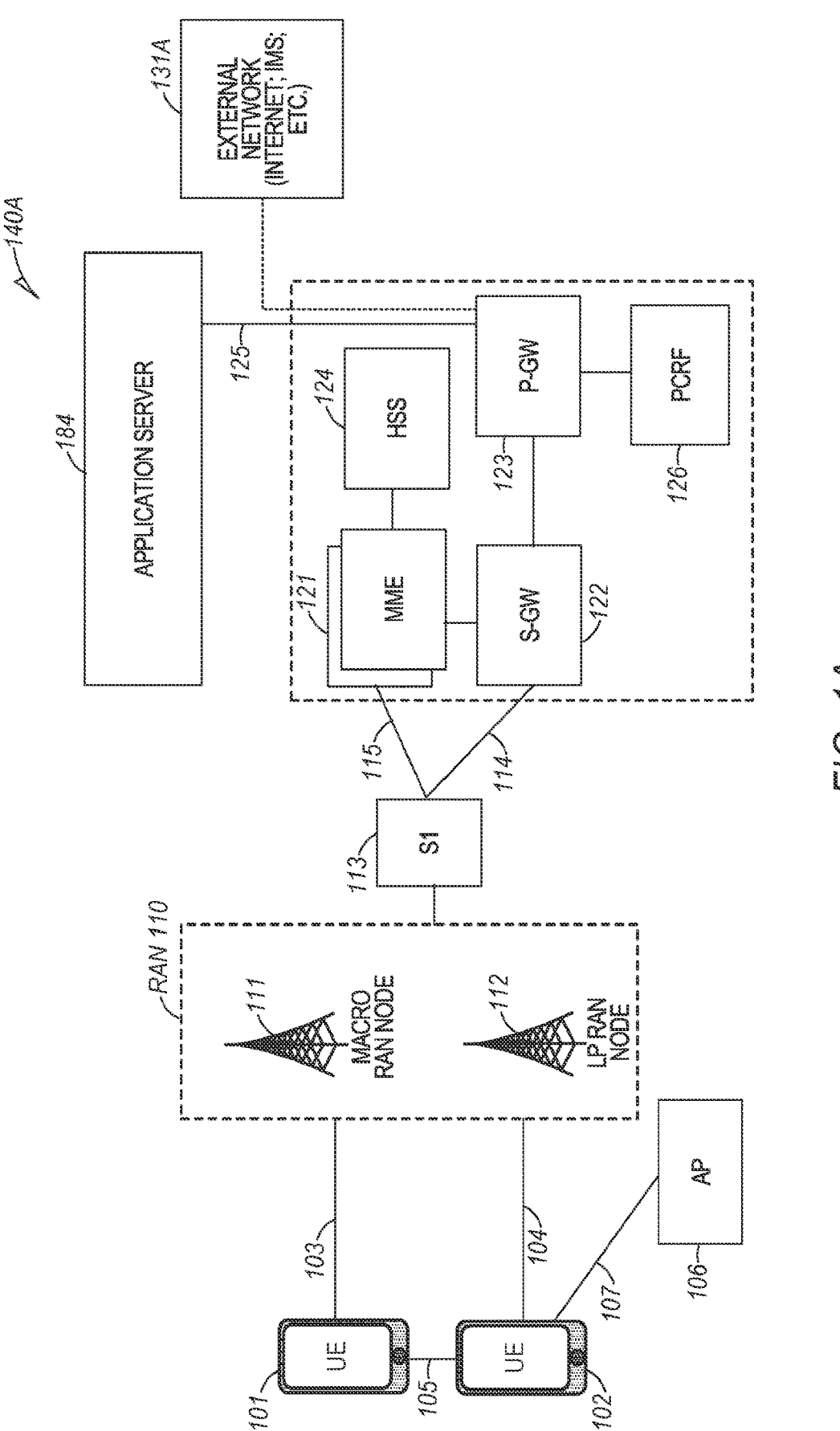
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHZ and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G network core (5GC) 120. The NG-RAN 110 can include a plurality of nodes, such as gNBs and NG-eNBs. The core network 120 (e.g., a 5G core network/5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
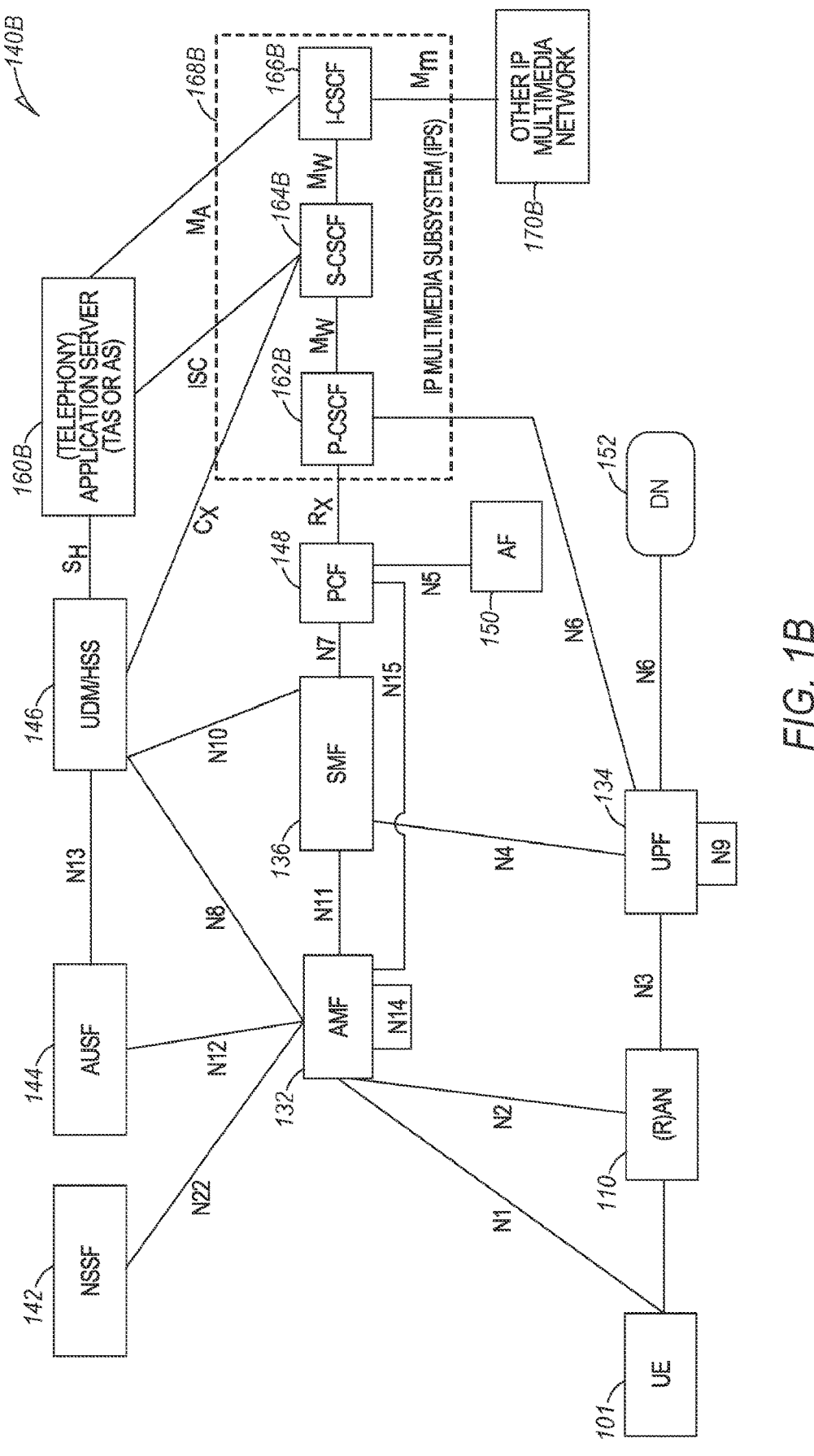
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
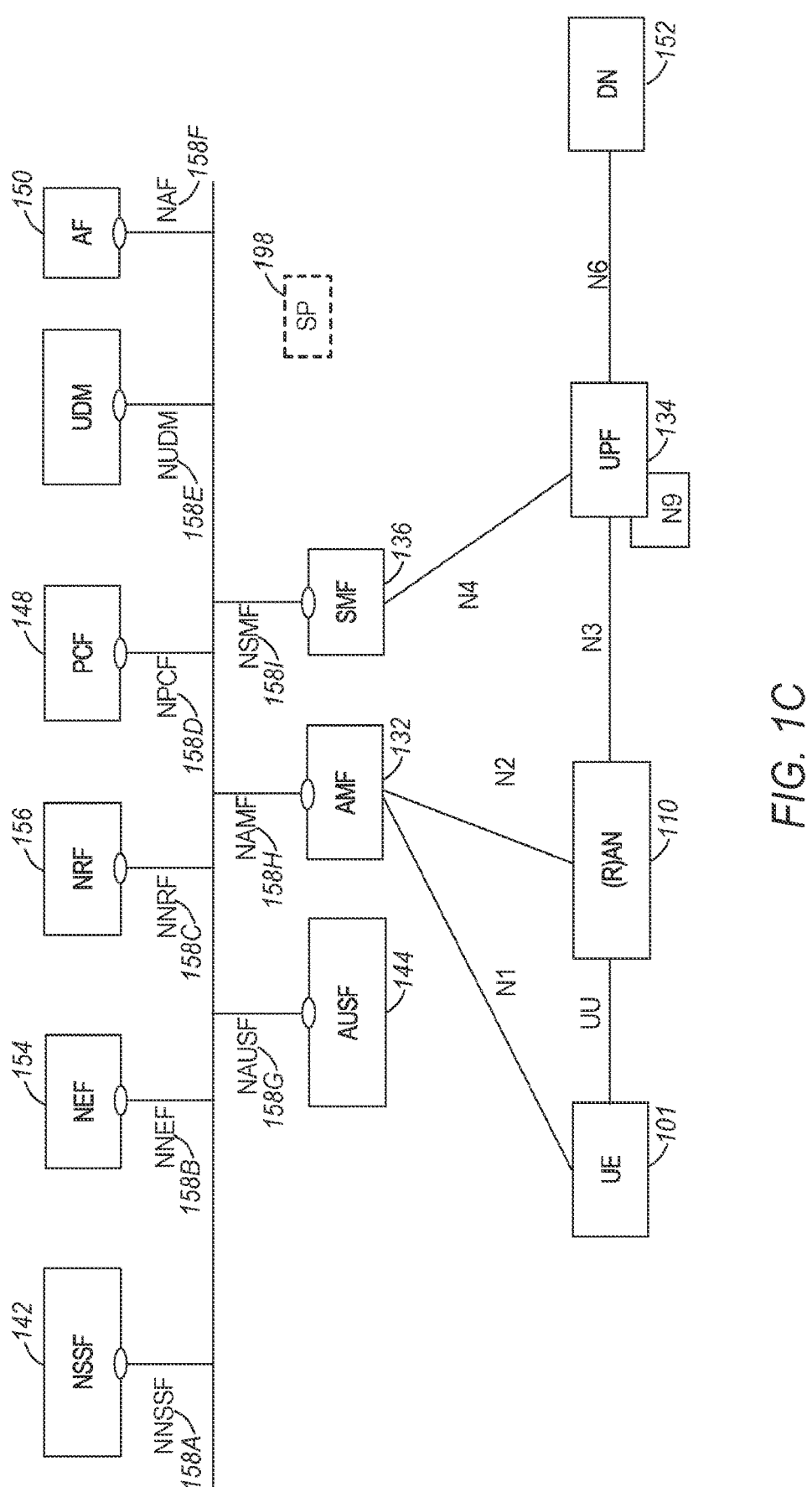
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
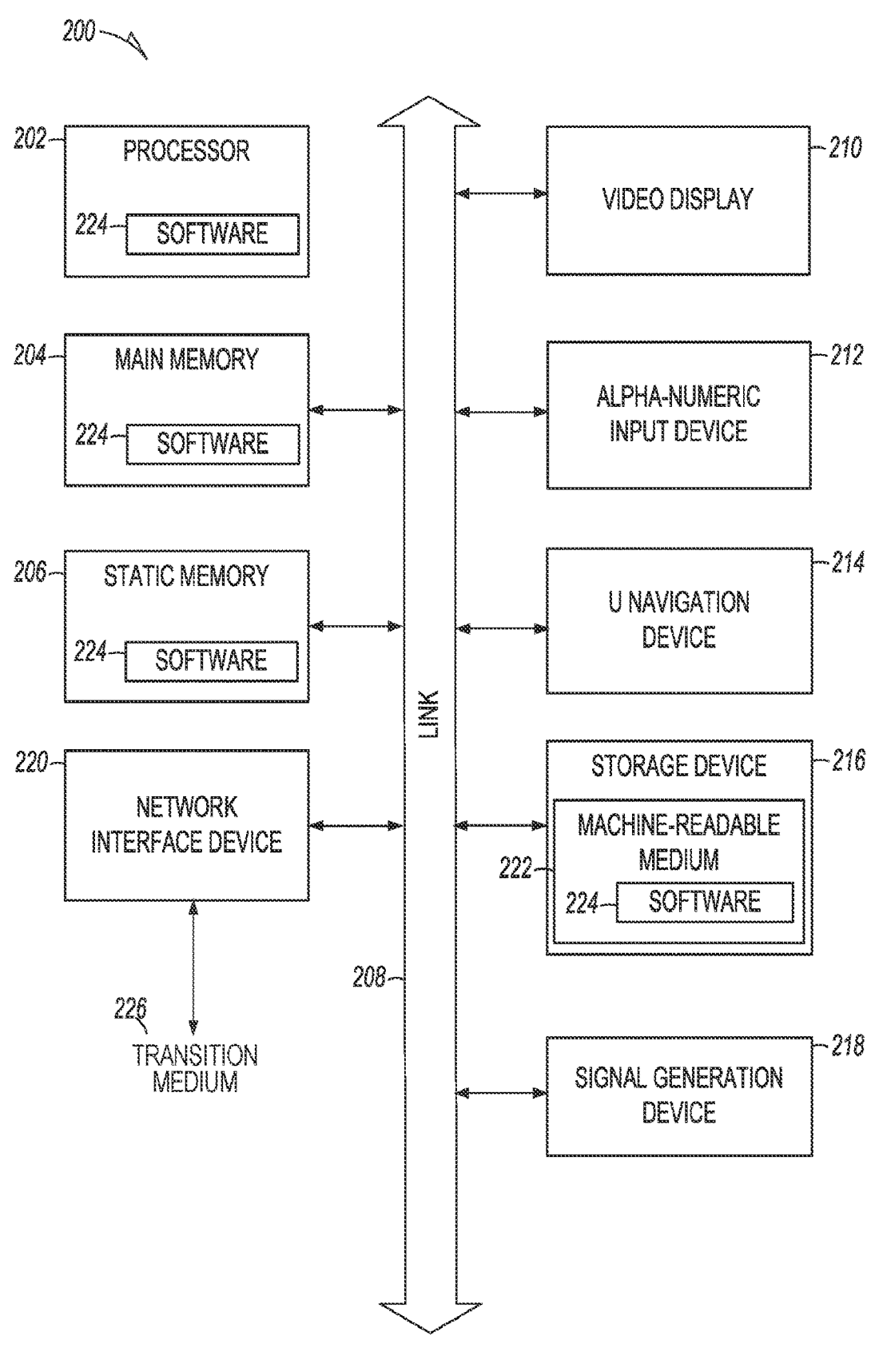
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-$4^{th}$ Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), Mul TEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WIDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V21) and Infrastructure-to-Vehicle (12V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European IT'S-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz. 3.6-3.8 GHz and further frequencies and SAS=Spectrum Access System/ CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHZ, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHZ, 610-790 MHz, 3400-3600 MHz, 3400-3800 MHZ, 3800-4200 MHz, 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHZ, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHZ, 37-38.6 GHz, 38.6-40 GHz, 42-42.5 GHZ, 57-64 GHz, 71-76 GHz, 81-86 GHz and 92-94 GHz, etc), the ITS (Intelligent Transport Systems) band of 5.9 GHZ (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as APs, eNBs, NR or gNBs-note that this term is typically used in the context of 3GPP fifth generation (5G) communication systems, etc. Still, a UE may take this role as well and act as an AP, eNB, or gNB; that is some or all features defined for network equipment may be implemented by a UE.

As above, 6G technology is currently under development. It is likely that Artificial Intelligence (AI) may be applied to wireless networks, making it useful for operators to make automated decisions through a set of management policies. In some situations, mobile network operator (MNO) business interests may be injected into AI-based decision making.

Aspects of policy-based network automation have been documented by standardization organizations such as the ETSI Zero touch network and Service Management (ZSM) Industry Specification Group (ISG). More specifically, ETSI GR ZSM 005 motivates policy-driven automation, lists a number of problems that can be solved via such automation, along with solution principles and concepts.

A gap of the existent solutions documented includes that the policy-driven automation concept as documented applies mostly to service management and configuration and not on low-layer functionalities (e.g., functionalities of the PHY, and MAC protocol stack layers).

Some embodiments may involve injecting MNO policies (e.g., preferences) into the AI learning and/or decision making process. Instead of dealing with MNO policies (preferences) in a specific system component, the injection of MNO policies into the AI decision making process may provide superior quality decision making and more efficient system configurations, leading to advantages in terms of revenue, Capital expenditures (CAPEX)/operating expenses (OPEX), power consumption, etc.

Figure 3:
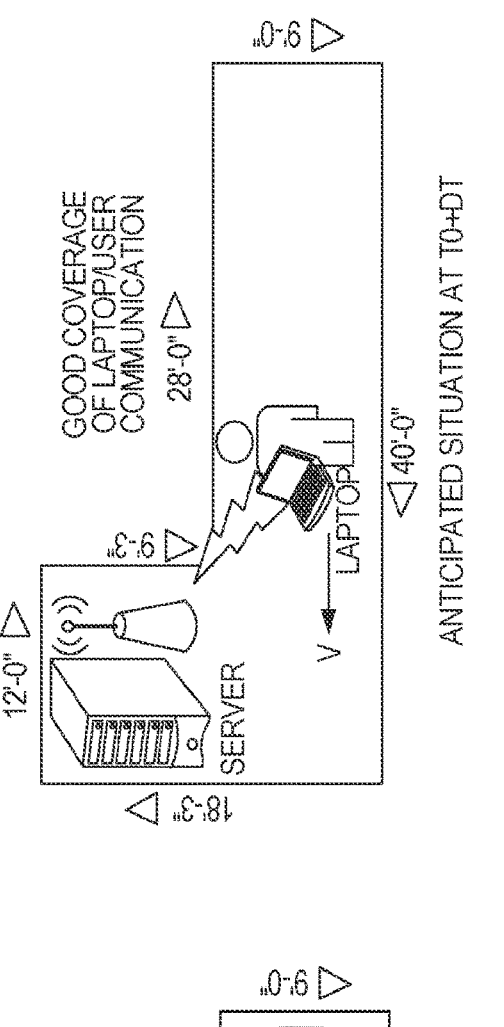
FIG. 3 illustrates THz system behavior in accordance with some embodiments.
Figure 3:
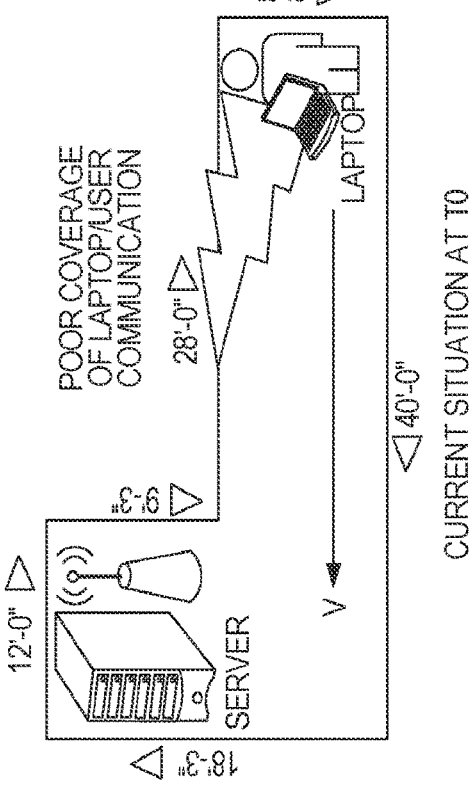

Use Case:

Embodiments herein may apply to any beyond-5G/6G use cases employing AI based decision making. To provide a specific example, a typical THz scenario is considered. Note that the term user and UE are used synonymously in the following description. FIG. 3 illustrates THz system behavior in accordance with some embodiments. THz systems use Line-of-Sight (LOS) connections. As shown in FIG. 3, a user may be initially out of coverage of a THz system (no LOS connection) and then enters into THz coverage as the user moves further in the environment. That is, initially the UE and access point shown are blocked by a physical wall (the corner as shown in FIG. 3), and then able to connect as the corner no longer becomes an obstacle.

In the above example: the user may have no access to context and configuration information in an unknown environment. The user may constantly scan for LOS THz coverage, which may increase power consumption. Once in LOS THz coverage, the user may through full beam selection procedure, which may increase both the power consumption and latency. Based on this, proposed requirements are provided for a future system related to Context Information Management Functionality (CIMF) and related AI based decision making. In particular, context information may be available across all layers to the entire system (for providing and requesting information), e.g. centrally managed (within device/system). In addition, context information may be acquired/prepared as desired instantly, e.g. up-to-date Channel State Information (CSI) or as anticipated, e.g., expected changes in terms of propagation conditions, etc. Context information may be acquired through multiple sources, including instant observations by the concerned equipment (e.g., sensors, Global Navigation Satellite System (GNSS), etc.), past observations by the concerned equipment (in identical situations), shared information provided by other equipment, and/or otherwise known/stored information, e.g. maps, etc.

Functional Architecture

Figure 4:
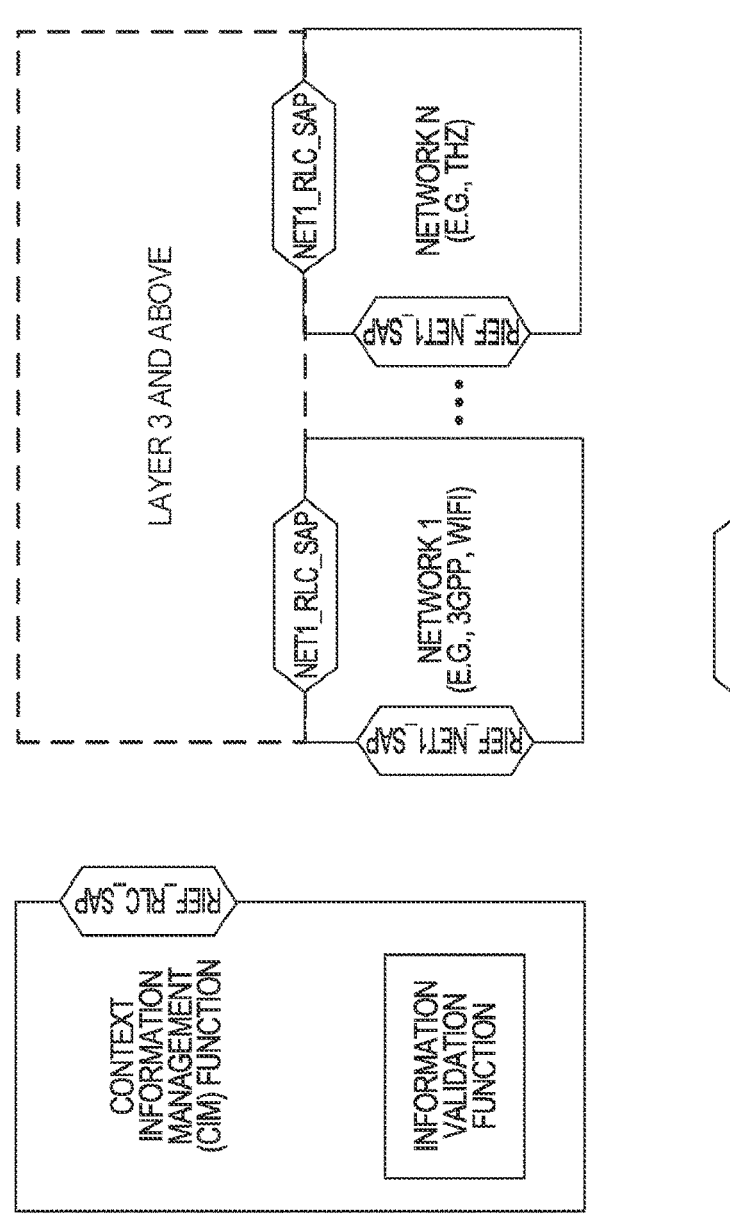
FIG. 4 illustrates system level functional architecture in accordance with some embodiments.
Figure 4:
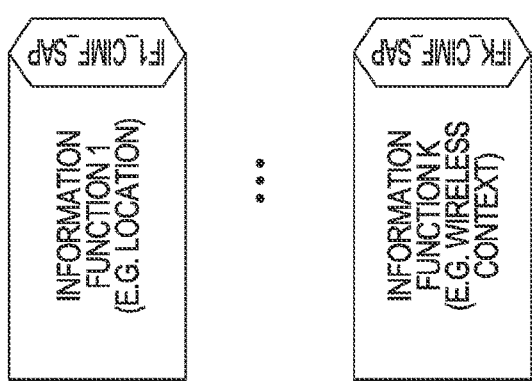

FIG. 4 illustrates system level functional architecture in accordance with some embodiments. As shown, the CIM function may interact with Layer-1 (Physical layer-PHY), and Layer-2 (data link layer) functions composed by the sub-layers MAC and Logical Link Control (LLC) from IEEE 802.2, or Radio Link Control (RLC) from 3GPP. The various building blocks and Service Access Points (SAP) are as follows:

The Information Function components 1, 2, . . . , K gather cognitive context information of potential interest to a communication component. The information may include information such as localization information (e.g. GNSS information), information of wireless context (e.g., which RATs are present (LTE, WiFi, 5G, etc.), which Quality-of-Service is provided by specific RATs (e.g. Radio Signal Strength (RSS) measurements, observed Packet Error Rates (PER), observed round-trip latencies, etc.).

The CIMF component interacts with the "Information Function" components through the "IF1_CIMF_SAP" Service Access Point. CIMF typically requests information (pull mode) from a specific Information Function component and then obtains the result. Alternatively, the information may be provided by the respective Information Function component without a specific request (push mode), for example, when a specific event happens (e.g. observed QoS metrics such as RSS/PER/latency is changing, etc.). The CIMF process the information received from Information Function components (e.g. reformatting the information to fit a standardized format) and provides the information to higher layers (typically Layer 3 and above) communication components through the RIEF_RLC_SAP Service Access Point.

The Lower Layers (typically Physical Layer (PHY Layer and Medium Access Control Layer (MAC Layer)) of any type of Communication systems (including LTE, 5G, WiFi, WiGig, Bluetooth, etc.) typically interact with the CIMF through the RIEF_NET1_SAP Service Access Point. The information exchange is bidirectional; for example, a specific communication component may provide information about the performance of a specific radio link (such as RSS measurements, observed PER, observed round-trip delay, etc.) to the CIMF. In return, a specific communication component may obtain information that is currently not accessible, e.g. information about typical link performance expected in the future (for example, historic information can be exploited which was observed by the user in the past and is processed by the RIE). The Lower Layers interact with a higher Layer (typically Layer 3) component through the NET1_RLC_SAP Service Access Point (LLC layers such as IEEE 802.2 LLC or 3GPP RLC).

The AI function may be defined in further detail below. The AI function may be used to exploit available knowledge and current observations in order to derive suitable decisions, e.g. whether THz components should be switched on/off, etc. As described, Layer 3 (and above) spans across all communication components. Alternatively, each communication component may have its own independent Layer 3 (and above); in addition to the individual Layer 3 (and above), an extension of Layer 3 (and above) may span multiple (or all) of the available communication components for coordination between the communication components, e.g. selection of one RAT among multiple RATs, etc.

Figure 5:
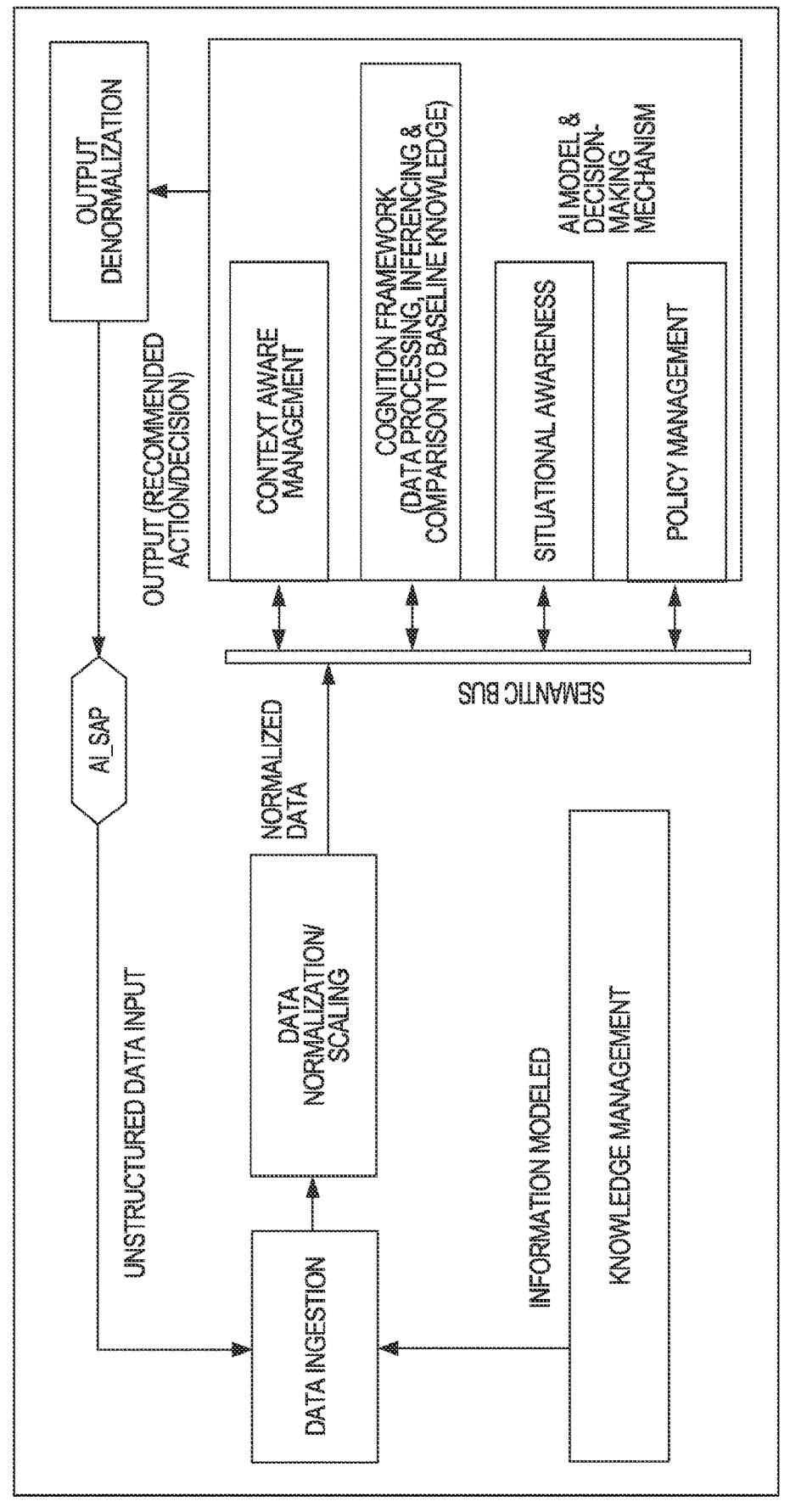
FIG. 5 illustrates an internal structure of the AI function in accordance with some embodiments.

FIG. 5 illustrates an internal structure of the AI function in accordance with some embodiments. In order to support predictive QoS services in the THz context (or other), the AI Function may include sub-components shown in FIG. 5. Note that some of the components may also be moved to other functions, for example the Data Ingestion and Data Normalization/Scaling components may be moved into the Context Information Management function.

Data Ingestion & Normalization/Scaling

Data originates from different sources. The Data Ingestion function processes data to achieve a common representation. Typically, the following operations are applied: Data Filtering for removal of unnecessary or not useful information; Data Correlation to create an association or relationship between data; Data Cleansing for detection and removal of corrupt, incomplete, inaccurate and/or irrelevant data; Data Anonymization and Pseudonymization for removing or protecting (encrypting) data that may be used to identify individuals; Data Augmentation for adding other types of data to the existing data set to enrich the data set, and Data Labelling to add class labels to data sets. In one THz example: data from different sensors/different devices are calibrated, such as THz field strength measurements, etc.

Knowledge Management

A Knowledge Management entity is used in the context of Artificial Intelligence and offers the following services: represent information and knowledge in a computer readable form (based on a set of suitable formalisms); formal and consensual knowledge representation enables machine learning and reasoning; inference systems are used to extend the knowledge base of the system. In one THz example: the Knowledge Management entity provides information in computer readable form (to be used for machine learning and inference) such THz coverage areas, THz Access Points locations/configurations, etc.

Context-Aware Management

A Context-aware Management entity tracks and updates context information. The Context-aware Management entity enables the system to gather information about itself and its environment. The information is used to make the system adapt its behavior according to changes in the context. In one THz example: environmental information enables optimum THz configuration, for example information and new/ removed obstacles, new/removed Access Points, etc.

Cognition Framework

The Cognition Framework entity targets to imitate the function of the human brain to understands concepts. This is achieved using a set of specialized data structures and computational procedures operating in a similar way to the human brain. Cognition is used to process new data, applying inferences and to compare the results to available knowledge. A cognition entity comprises at least three functions: interfaces interacting with the environment providing data; processing that can analyze and manipulate data, information and knowledge; and storage to hold data, information and knowledge. In one THz example: inference methods are used to exploit THz field strength measurements, environment observations, etc. to predict THz coverage areas and recommended parameterization (e.g., beam selection, MCS configuration, etc.).

Situational Awareness

The Situational Awareness entity enables the system to understand what has just happened, what is likely to happen and how both may affect the objectives of the system. The process comprises five actions: gathering data (perception), understanding the significance of the data (through facts and inferences), determining what to do in response to the given event, and making a decision and executing those actions. In one THz example: The situational awareness entity may obtain information/predict the arrival of obstacles degrading a THz communication link. One or more suitable decisions may be taken in response, e.g. connect to a different access point, change the RAT, etc.

Policy Management

In general, policy is a way to express rules and restrictions on behavior and then automate the enforcement of those rules. The Policy Management entity provides a set of uniform and intuitive mechanisms for consistent recommendations and commands meeting the following: to be able to transform data and information to a common format that facilitates generating outputs and to use a set of models including data types and structures for producing outputs. Data Denormalization may be achieved by a separate functional block. In one THz example, the User/System/Admin may provide (high-level) policies indicator the behavior of the AI system, e.g. in which circumstances should a RAT change occur, which RATs should be favored (e.g. Cellular vs unlicensed), etc.

MNO Policies Injected into AI Decision Making

Embodiments may assume that MNO policies may include system configuration preferences that optimize, directly or indirectly, the revenue of the MNO. Those policies may include for example: RAT preferences (e.g., prefer cellular licensed services (LTE, NR, etc.) over unlicensed services (WiFi, NR-U)); off-loading preferences, e.g. under certain conditions traffic is off-loaded to unlicensed services (WiFi, NR-U), etc . . . .

The Following Two Approaches May be Used:

Post-AI-Processing

Figure 6:
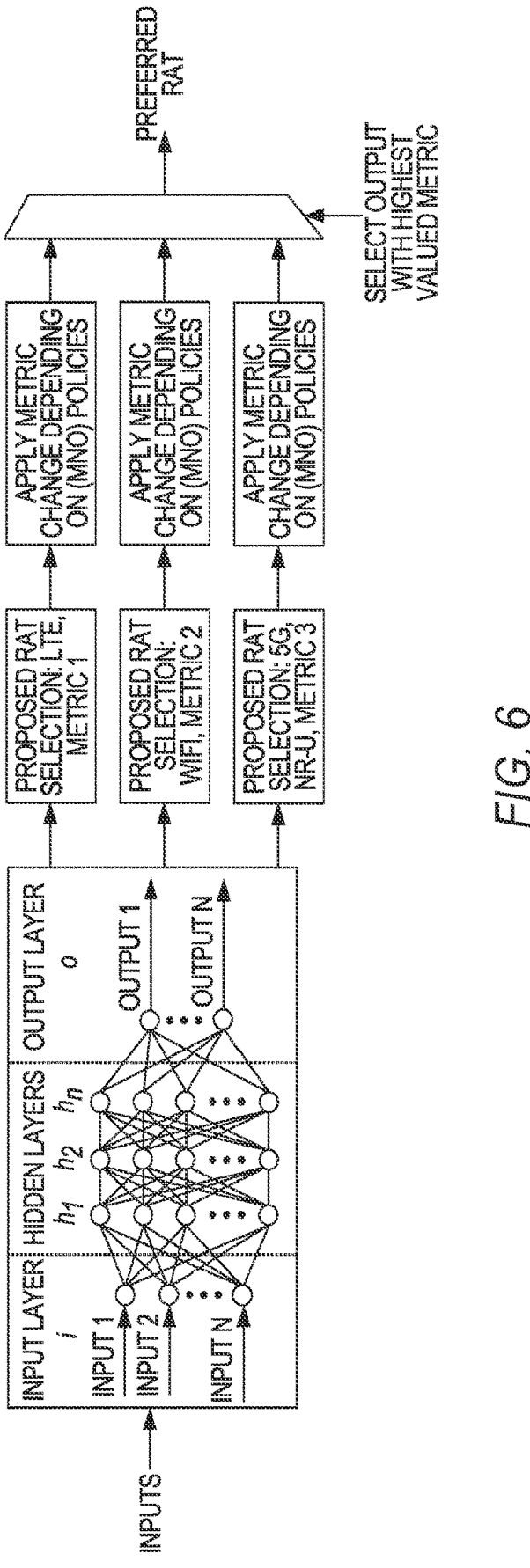
FIG. 6 illustrates policy-based selection of AI outputs in accordance with some embodiments.

In this case, explainable AI approaches are used in the sense that an AI processing entity does not deliver a single decision but multiple decisions in combinations with (weighted) metrics. Typically, the highest metric indicates the most preferable solution and the lowest metric the least preferable solution. FIG. 6 illustrates policy-based selection of AI outputs in accordance with some embodiments.

The AI output metrics are then combined with the MNO Policy preference, typically applying an additive and/or multiplicative factor to each of the outputs depending on the MNO preferences. For example, assume that the MNO prefers to use LTE over WiFi or NR-U in case that the signal to interference noise ratio (SINR) of LTE is 30% of WiFi's SINR or better. Assume that an AI based decision making entity selects the best RAT in function of the observed SINR. If the WiFi has an observed SINR of 20 dB and LTE has 30% of the SINR, the AI decision making may provide two output vectors: i) WiFi, metric SINR 20 dB; ii) LTE, metric SINR 30% of 20 dB, indicating that WiFi is the preferred choice. The MNO may change the result by adding a corrective term to the metrics whose results which the MNO prefers (e.g., LTE in our example). The modified result may thus be i) WiFi, metric SINR 20 dB [note: unmodified, since it is not preferred by MNO]; ii) LTE, metric SINR 30% of 20 dB+corrective term. If the resulting LTE metric is better than the WiFi metric, LTE will be used. This shown in FIG. 6.

Policy-Based AI Training

Figure 7:
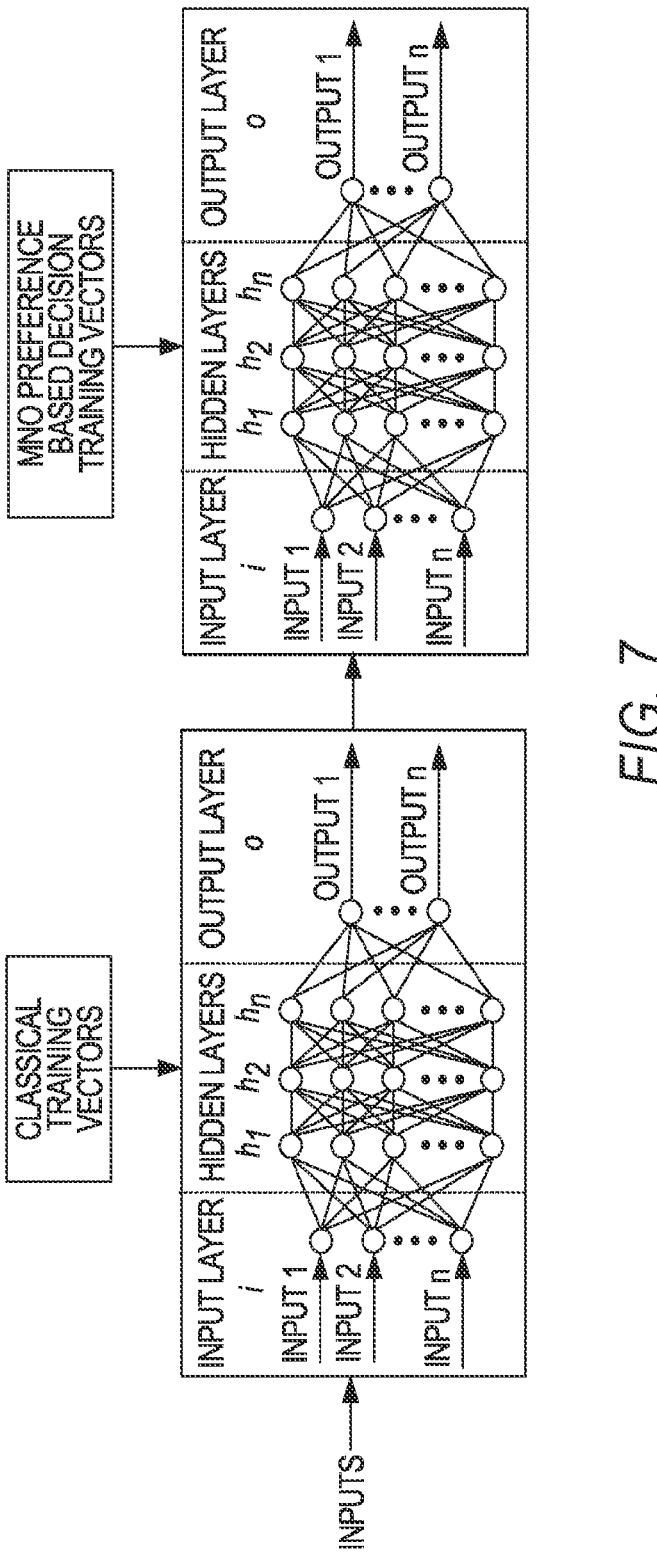
FIG. 7 illustrates another policy-based selection of AI outputs in accordance with some embodiments.

In another case, training vectors of the AI system may be altered in function of the (MNO) policies/preferences. FIG. 7 illustrates another policy-based selection of AI outputs in accordance with some embodiments.

For Example:

| Classical case | (MNO) preference based decision |
|---|---|
| {SINR LTE = SINR WiFi + 5 dB} -> select LTE | {SINR LTE = SINR WiFi + 5 dB } -> select LTE |
| {SINR LTE = SINR WiFi − 5 dB} -> select WiFi | (SINR LTE = SINR WiFi − 5 dB} -> select LTE |
| {SINR LTE = SINR WiFi − 10 dB} -> select WiFi | {SINR LTE = SINR WiFi − 10 dB } -> select LTE |
| {SINR LTE = SINR WiFi − 15 dB} -> select WiFi | {SINR LTE = SINR WiFi − 15 dB} -> select WiFi |
| | (e.g., if SINR difference gets too important, the better performing technology is selected although |

-continued

| Classical case | (MNO) preference based decision |
|---|---|
| | it may not be preferred from a revenue perspective) |

Combination of Policy Based AI Training and Post-AI-Processing

In this case, the two approaches above are combined. e.g., training vectors are applied reflecting the (MNO) policies/preferences and at the output of the AI processing, relating metrics are adapted and used to derive the preferred decision.

Figure 8:
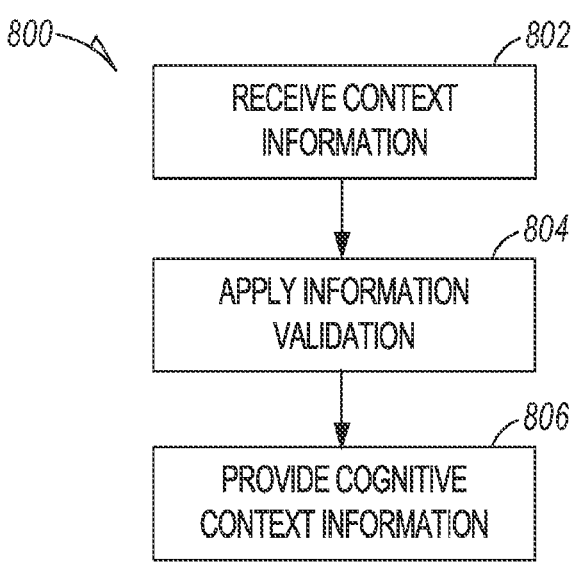
FIG. 8 illustrates context information management operations in accordance with some embodiments.

FIG. 8 illustrates context information management operations in accordance with some embodiments. The context information management method 800 may be performed by a context information management function and may include, at operation 802, reception of cognitive context information from an information function component. At operation 804, an information validation function may be applied to the cognitive context information. At operation 806, the cognitive context information may be provided to a network via a service access point.

Figure 9:
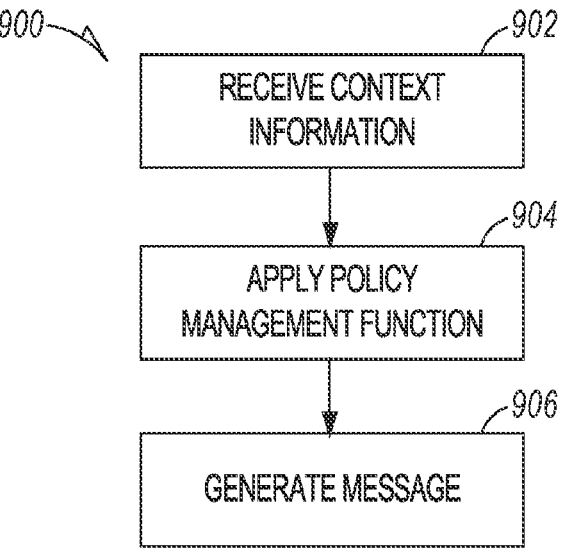
FIG. 9 illustrates AI service access point operations in accordance with some embodiments.

FIG. 9 illustrates AI service access point operations in accordance with some embodiments. The AI service access point method 900 may be performed by AI service access point and may include reception of context information at operation 902. At operation 904, a policy management function may be applied to the context information to determine an action associated with connection to an AP. At operation 906, an output message that includes an indication of the action associated with connection may be provided to the AP.

The AI component may also be used to predict when a user (or UE) is going to enter a (mm Wave/THz/etc.) coverage area and then, based on the obtained AI-based prediction, timely adapt physical (PHY) frame structures (presence of synchronization symbols, etc.) and switch on/off one or more APs in the vicinity of the user.

Wireless communications are characterized by communications using a number of different frequencies. Wireless communications at lower (e.g. sub-6 GHz) and higher frequency bands (e.g., mmWave, sub-THz and THz) each have advantages and disadvantages. Lower frequency bands may have higher coverage/reliability but limited maximum data rates, and relatively easy setup (beam-training/tracking may be avoided) but with a crowded spectrum. Higher frequency bands may have very high data rates but with low reliability (e.g., occurrence of blockage events, easy radio link loss), and large bandwidths with low occupancy but high beam-training/connection setup overhead (challenging for low-latency applications).

From the above, one can observe that the benefits and drawbacks of the two frequency bands are complementary. Such a divergence in the achievable key performance indicators (KPIs) is significant, because when one or the other technology is deployed in a standalone fashion, it might negatively impact the Quality-of-Experience (QoE) for devices/mobile/user equipment (UEs) running applications in a multitude of use cases.

More specifically, considering an indoor scenario, applications demanding multi-Gigabit data-rates may not be executed in a room where low band APs would be installed. On the other hand, in the existence of standalone high band APs, high data-rates may be provided, however at the cost of a considerable energy and connection setup (beam-training) overhead. In the latter case, such an overhead may be unavoidable even when the running applications would be characterized by reduced data rate demands.

Embodiments disclosed herein may be directed to providing solutions for optimizing the operation of an indoor multi-band radio access system based on available context information and considering the services' performance requirements. More specifically, some embodiments may be directed to optimally adapting PHY frame structures (e.g., presence of synchronization and/or channel estimation training symbols) according to obtained AI-based QoS predictions. Some embodiments may be directed to optimizing the activity mode of high band APs only when the channel allows sufficient data rate per the wireless application's performance requirement.

PHY frame structures previously "static" in the sense that there are always synchronization sequences, channel estimation pilot symbols, etc. transmitted. Also, APs (WiFi/mmWave/THz/etc.) are "always-on" even if users/UEs are not in the AP's coverage area. MAC frame size adaptation may be used to reduce transmission overhead. The 802.11 standard introduces two methods of fixed frame aggregation, namely Aggregated MAC Service Data Unit (A-MSDU) and Aggregated MAC Protocol Data Unit (A-MPDU). However, although larger frames result to less channel accesses/scarcer transmissions (and, thus, to lower overhead), erroneous transmissions impact large data payloads, which may result in the use of retransmissions. The latter is translated to large delays, larger power consumption and occupation of wireless bandwidth resources. The relation between frame length and network operation efficiency may result in a Dynamic Frame Aggregation (DFA) scheme in which the transmission rate and the number of aggregated frames are determined dynamically based on channel condition. The DFA MAC scheme predicts the optimal frame size and optimal transmission rate for the next transmission according to the Packet Error Rate (PER) under the expected channel quality. To determine the proper frame length and suitable transmission rate for a channel condition, the DFA MAC scheme relies on the received ACK signal strength; therefore, such a method is reactive and not proactive Similar approaches (e.g., PER-based), however, do not exploit several contextual information attributes.

This approach, unfortunately, is highly inefficient because the worst case is always assumed (in terms of users always connecting to the system, high speed up to 500 km/h or more, etc.) for the design of the PHY frame. In addition, the wireless APs are enforced to be constantly in operation mode, even when the expected data rate, end-to-end latency, reliability of communication is not expected to meet the stringent requirements of an application running at the UE.

In embodiments disclosed herein, by contrast, the full synchronization sequence may be limited to only be transmitted when the user is actually synchronizing to the system and not otherwise. Afterwards, only a limited sequence is used for re-synchronization to the next frame. Similarly, the channel estimation training symbols can be reduced when the user mobility is low, etc.

In some embodiments, assuming a multi-band radio access system, an AI-based, predictive QoS function deployed at the network side may be able to exploit various user contextual information attributes by means of (both historical and recent) collected data to:

1 Adapt the activity mode of high band APs (e.g., on/off), to the expected arrival (departure) of user(s) to (from) the coverage area (e.g., the user load) and feasibility of required data rates for specific UEs under coverage; and 2 Adapt the PHY frame structure to the UE characteristics (e.g., number of antenna elements, transmit power) and requirements of applications launched by users anticipated to reach the AP's coverage area.

Such embodiments may dramatically improve the overall efficiency of systems. Power may be saved since APs are only switched on when users are in proximity and intending to connect. Also, the overall PHY frame efficiency (and, thus, spectral efficiency) is improved by reducing the learning sequences (synchronization sequences, channel estimation symbols etc.) to the strict minimum. The optimized performance is expected to ease the adoption and deployment of high band radio access technologies (mm-wave, THz).

Use Case:

The THz scenario shown in FIG. 3, in which a user is initially out of coverage of a high band system, for example THz, (no LOS connection) and enters into THz coverage as the user moves further in the considered environment, is provided. In a traditional system (e.g., no AI for predictive QoS), the following approach would be used (highly inefficient, but no other choice because of a lack of information). 1) the user has no access to context and configuration information in an unknown environment, 2) the user constantly scans for LOS THz coverage (e.g. beam searching/ tracking), thereby increasing power consumption, and 3) once in LOS THz coverage, the user goes through a full beam selection procedure, thereby increasing power consumption and latency.

New Approach: System Management and Reconfiguration by AI Predictive QoS Function In embodiments disclosed herein, by contrast, the following approach may be used with an AI-based predictive QoS function used to constantly reconfigure the system to the most efficient working/operating point: context information may be available across all layers to the entire system (for providing and requesting information), e.g. centrally managed (within device/system).

New functionality: The AI predictive QoS function is observing the user movement and is anticipating future actions:

When the user is out of coverage of the (mmWave/THz/ etc.) AP and there is no other user present, the AP may be switched off and only switched on just before the user intends to connect. The AI predictive QoS function anticipates when the user(s) are approaching the AP coverage area and switches the AP on when desired.

When the user is out of coverage of the (mmWave/THz/ etc.) AP, scanning for the AP may be avoided, e.g. the user can save power. The AI Predictive QoS function is indicating to the user device when the user device can start scanning for the AP.

When the user is entering the coverage of the (mmWave/ THz/etc.) AP, the user synchronizes to the system. The AI predictive QoS function therefore instructs the AP to add synchronization sequences to the PHY frame until all concerned users are connected to the AP. When all concerned users are connected, a shortened synchronization sequence (or none at all) is used for future frames. This may be sufficient to allow users to refine the synchronization from one frame to the next while avoiding the full synchronization procedure. This may allow to allocate more capacity for useful data and thus improvement in the overall spectral efficiency.

The AI predictive QoS function observed the user behavior, in particular, the user movement dynamics (e.g., static, nomadic (e.g., pedestrian), mobile (e.g., bicycle), highly mobile (e.g., car, train, etc.)). Depending on the user dynamics, the number of training/reference symbols in the PHY frame are adapted; for low mobility users, the number of such symbols is kept to a strict minimum, while for higher mobility users a larger number is added. Typically, the worst case (e.g. highest mobility) user among all present users is taken. The number of symbols is adapted in both time and frequency axis if OFDM-type of modulation is used. For example, depending on the predicted position of the user a greater number of or fewer reflections may appear altering the frequency selectivity.

Figure 10:
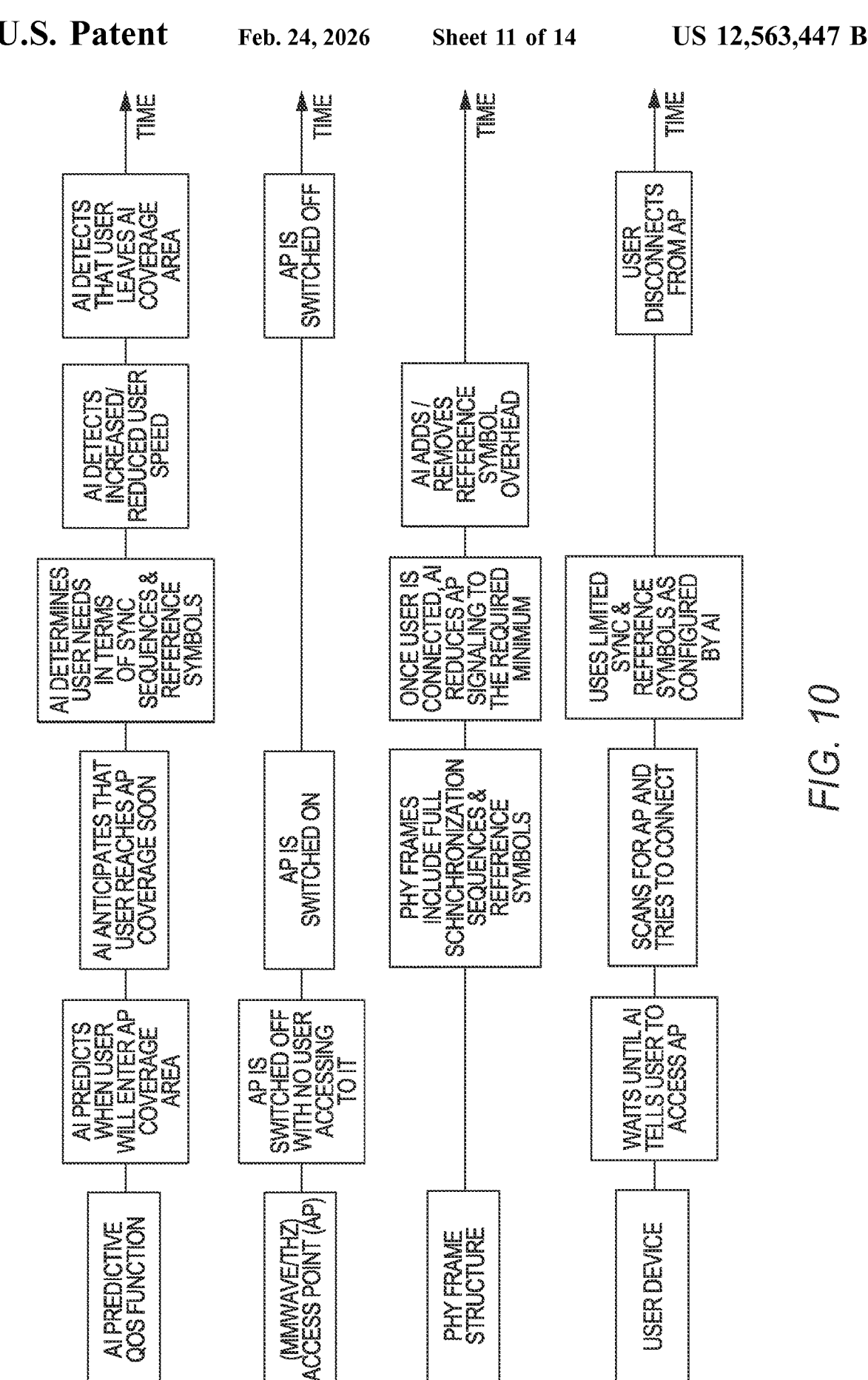
FIG. 10 illustrates an AI Quality of Service (QOS) prediction driven system configuration in accordance with some embodiments.

FIG. 10 illustrates an AI Quality of Service (QOS) prediction driven system configuration in accordance with some embodiments. The basic principle of the present approach above is illustrated in FIG. 10, which indicates operations of the AI predictive QoS function, the AP, the PHY frame structure, and the user device. It should be noted that the AI-based QoS prediction function may operate by implementing a Supervised Learning algorithm taking as input labelled contextual data from the UEs.

Dynamic Adaptation of PHY Frame Structure

Figure 11:
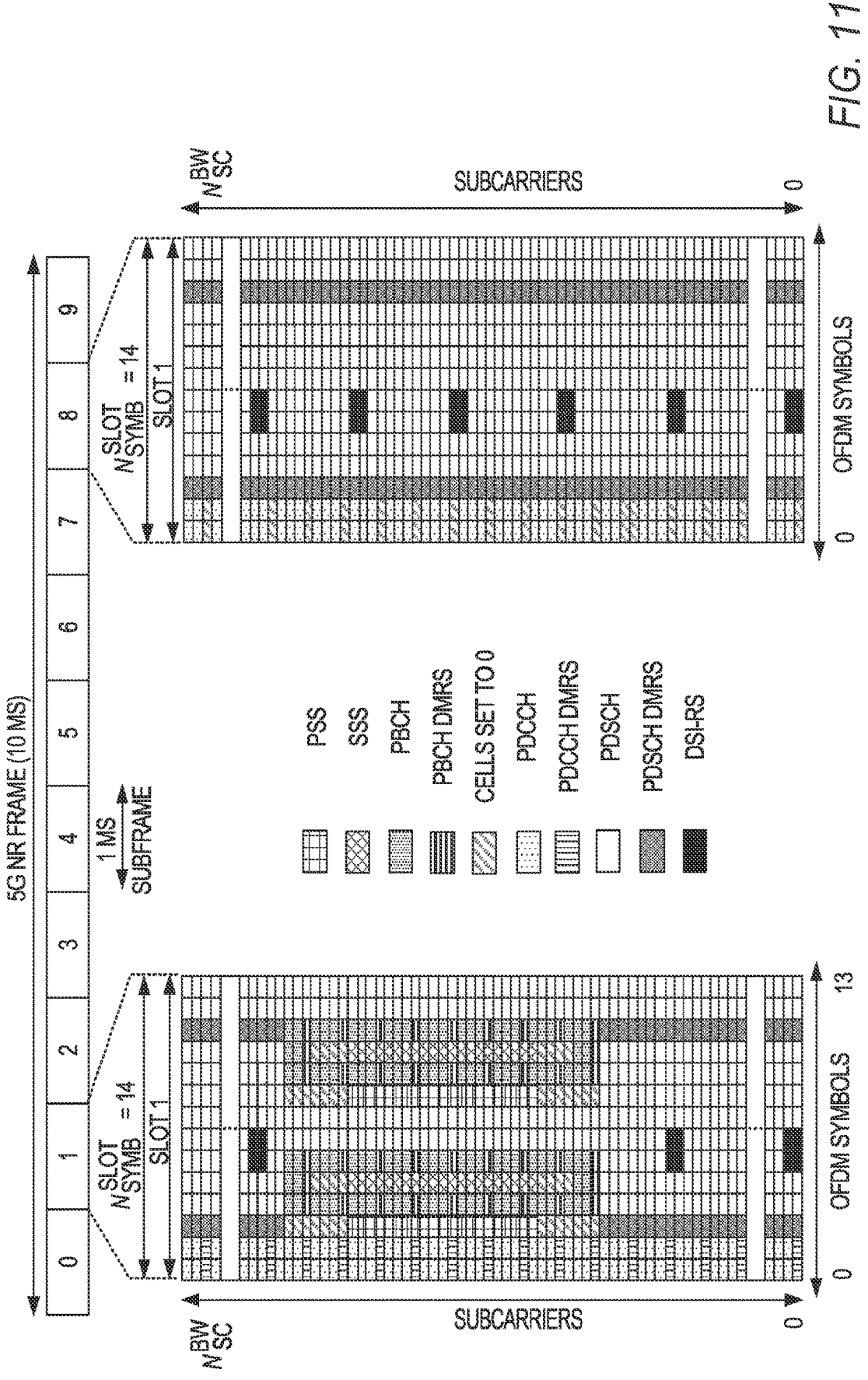
FIG. 11 illustrates a 5G frame structure in accordance with some embodiments.

As illustrated in FIG. 10, in some embodiments an AI predictive QoS function dynamically adapts the synchronization sequence and other training symbols to the user. The future 6G frame structure is not yet known, so the current 5G NR structure is shown as an example, but the basic principles can be adapted to any frame structure definition. FIG. 11 illustrates a 5G frame structure in accordance with some embodiments. As can be seen in FIG. 11, subframe 1 contains a large number of training/reference symbols.

As illustrated in FIG. 11, all of the training symbols may be introduced into the first frame when a new user is accessing the system. Once the user has gained access to the system, this overhead can be reduced. For example, it can be added only every xth frame with x>1. Also, the demodulation reference signal (DMRS) sequences can be reduced when the user is of low mobility. Instead of the training symbols, the AI predictive QoS function may allocate user data symbols and inform attached users through signaling information about the modified allocation. For example, only every $2^{nd}$, $3^{rd}$, $4^{th}$, etc. (typically depending on the user speed) of the DMRS fields are being used and the rest are allocated to user data information. Depending on the expected frequency selectivity also a sparse spacing in the frequency domain can be deployed.

In case of multiple users being attached an AP, the worst case user (e.g., user with highest mobility, etc.) may be considered in order to decide the level of synchronization sequences and learning symbol overhead.

Dynamic Usage of the High Band Communication System at Both AP and Device Side

For these cases, there an always-on connection based on a low band and high coverage system that has limited data rate. However, this means it is always possible to exchange information between the AP and the device, even if the high data rate, high band link is not used. The context information used to power on the high band link could be managed by the device, the AP or by an independent network entity. In these cases, the decision for usage of the high data rate link is taken by different entities. Accordingly, these cases have different characteristics:

Device Managed Context Information

In this case, the context information is managed by the devices. Based on the QoS requirements, other communication related requirements and the context information about the high band link, the UE may decide to request testing/probing if the high data rate link is available. Thus, the UE may send to the respective AP or network entity a high data rate service request. Depending on the context information available at the AP and other network entities, the network may respond with either a network for connection setup or a response refusing the request. To enable a quick connection setup, the context information relevant to enabling the high data rate link can be exchanged before the start of the connection.

AP or Network Managed Context Information

In this case, all context information is continuously sent from the APs or devices to a central entity or to distributed network entities (e.g. edge nodes). Based on all available context information and the communication requirements, the central entity/distributed network entities afterwards decides if trying to use the high band link is possibly beneficial. If so, the central entity/distributed network entities sends information to set up the high band link for a speed up communication setup to the device and the AP.

Figure 12:
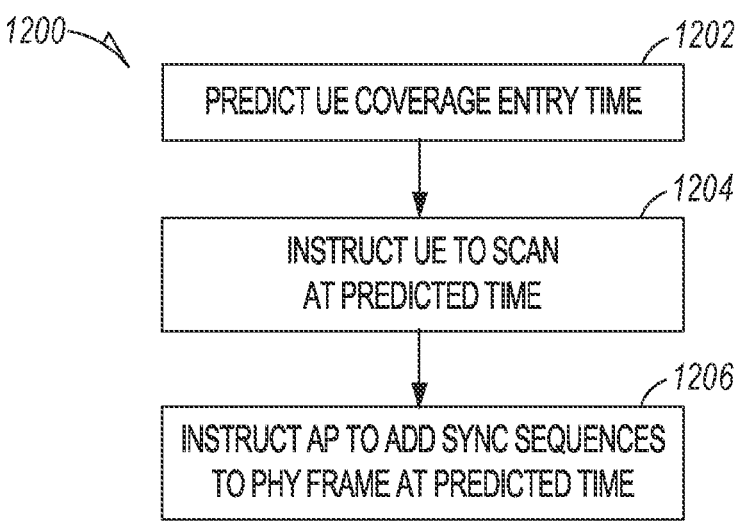
FIG. 12 illustrates an AI synchronization method in accordance with some embodiments.

FIG. 12 illustrates an AI synchronization method in accordance with some embodiments. The AI synchronization method 1200 may be performed by a predictive quality of service (QOS) function and may include predicting a time that a UE will enter a coverage area of an AP at operation 1202. At operation 1204, the UE may be instructed to scan for the AP at the predicted time. At operation 1206, the AP may be instructed to add synchronization sequences to a PHY frame at the predicted time to allow the UE to synchronize to the AP. In some embodiments, predicting that the UE will enter the coverage area of the AP includes determining a movement dynamic of a user associated with the UE. For example, the movement dynamic includes a level of mobility. In some embodiments, the method further includes detecting an increase or decrease in the user's level of mobility over a predetermined time period. In some embodiments, a number of training or reference symbols in the PHY frame is determined based on the movement dynamic of the user. In some embodiments, the method further includes instructing the AP to switch off in response to determining that the UE is not within the coverage area of the AP.

Figure 13:
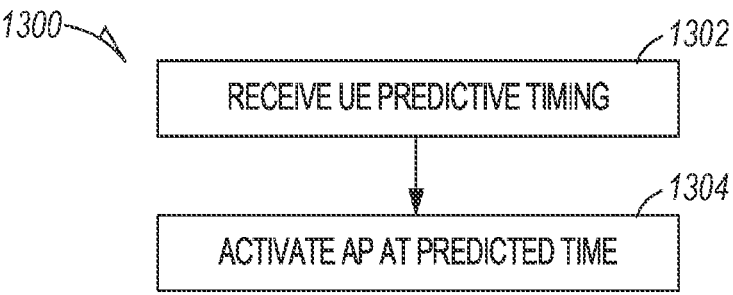
FIG. 13 illustrates another AI synchronization method in accordance with some embodiments.

FIG. 13 illustrates another AI synchronization method in accordance with some embodiments. The other AI synchronization method 1300 may include, at operation 1302 receiving, from a predictive QoS function, a message containing an indication that a UE will be within a predetermined coverage range of an AP at a predetermined time, and an indication of synchronization sequences to add to a PHY frame at the predicted time to allow the UE to synchronize to the AP. At operation 1304, the AP may be switched on at the predetermined time in response to the message.

Figure 14:
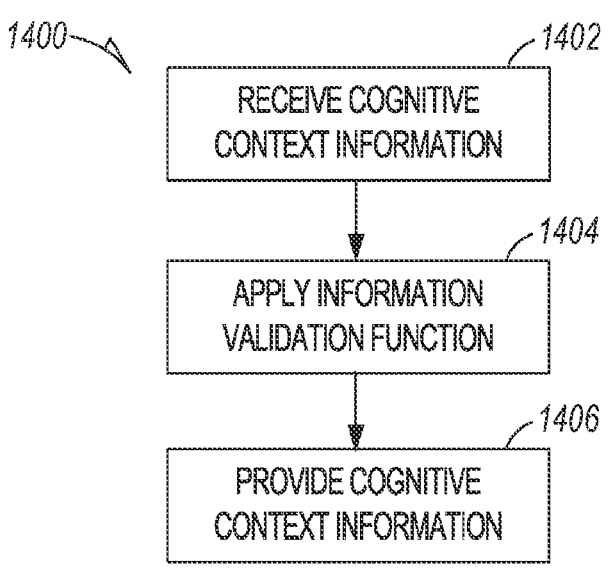
FIG. 14 illustrates a Context Information Management (CIM) function in accordance with some embodiments.

FIG. 14 illustrates a CIM function in accordance with some embodiments. As shown, at operation 1402 of the CIM function 1400, the CIM function entity may receive cognitive context information from an information function component. At operation 1404 the CIM function entity may apply an information validation function to the cognitive context information. At operation 1406 the CIM function entity may provide the cognitive context information to a network via a service access point.

Figure 15:
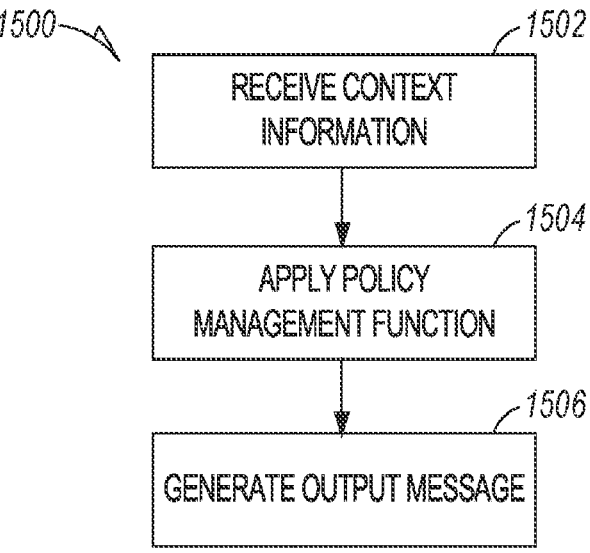
FIG. 15 illustrates an AI function in accordance with some embodiments.

FIG. 15 illustrates an AI function in accordance with some embodiments. As shown, at operation 1502 of the AI function 1500, the AI function entity (or AI SAP) may receive context information from an information function component. At operation 1504 the AI function entity may apply a policy management function to the context information to determine an action associated with connection to an access point. At operation 1506 the AI function entity may provide an output message that includes an indication of the action associated with connection to the AP.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of an artificial intelligence (AI) service access point (SAP), the apparatus comprising:

an interface configured to receive context information from information functions in a wireless system;

a data input entity configured to process the context information to obtain a common representation, the data input entity comprising a data normalization and scaling entity;

a knowledge management entity configured to provide information modeling to the data input entity to enable machine learning and inference associated with the context information; and an AI model and decision making entity configured to receive modified context information that has been normalized and scaled by the data normalization and scaling entity and determine a response based on external policies, the AI model and decision making entity comprising a context-aware management entity configured to track and update context information.

2. The apparatus of claim 1, wherein the AI model and decision making entity further comprises:

a cognition framework entity configured to process new data, apply inferences and compare results of the inferences to available knowledge, a situational awareness entity configured to determine effects of events within a fifth generation (5G) or later system on objectives based on mobile network operator (MNO) policies, and a policy management entity configured to provide rules and restrictions on behavior within the 5G or later system based on the MNO policies.

3. The apparatus of claim 2, wherein the data input entity is further configured to:

filter the context information, create an association between data of the context information, detect and remove corrupt, incomplete, inaccurate and irrelevant portions of the context information, remove or encrypt portions of the context information that are able to identify people, augment the context information with other types of data to enrich the context information, and create data sets from the context information and label the data sets using class labels.

4. The apparatus of claim 2, wherein the knowledge management entity is further configured to:

represent the context information in a computer readable form, enable machine learning and reasoning, and extend a knowledge base of AI functions.

5. The apparatus of claim 2, wherein the context-aware management entity is further configured to gather information about devices in operation and an environment of the wireless system as the context information, the context information for behavioral adaption based on changes in the context information.

6. The apparatus of claim 2, wherein the cognition framework entity is further configured to interact with an environment that provides the context information, analyze and manipulate the context information, data, and available knowledge, and store the context information, data and available knowledge.

7. The apparatus of claim 2, wherein the situational awareness entity is further configured to determine network actions that are based on the external policies to undertake in response to the events and execute the network actions, the network actions based on the external policies.

8. The apparatus of claim 2, wherein the policy management entity is further configured to automate enforcement of the rules using a set of models including data types and structures for producing outputs having a common format.

9. The apparatus of claim 1, wherein the external policies include system configuration preferences that optimize revenue of the external policies and include Radio Access Technology (RAT) preferences and off-loading preferences.

10. The apparatus of claim 1, wherein the AI model and decision making entity is further configured to deliver multiple decisions in combinations with metrics in which a highest metric indicates a most preferable solution and a lowest metric indicates a least preferable solution.

11. The apparatus of claim 10, wherein further comprising a situational awareness entity configured to combine the multiple decisions with external policy preferences through application of at least one of an additive or multiplicative factor to each of the multiple decisions depending on the external policy preferences.

12. The apparatus of claim 1, wherein:

training vectors of the AI model and decision making entity are based on external policy preferences, and the external policies comprise mobile network operator (MNO) policies.

13. An apparatus of an artificial intelligence (AI) service access point (SAP), the apparatus comprising:

processing circuitry configured to control behavior of a user equipment (UE) for quality of service (QOS), the processing circuitry configured to:

decode positional and movement information of the UE;

determine timing indicating when the UE is to be within range of an Access Point (AP) based on the positional and movement information of the UE; and encode, for transmission to the AP, control signals to control activation of the AP and synchronization signaling provided by the AP for the UE based on the timing; and a memory configured to store the positional and movement information of the UE.

14. The apparatus of claim 13, wherein:

first control signals the deactivate the AP in response to a determination that no UE is within the range of the AP, and second control signals to activate the AP prior to a determination, based on the positional and movement information of the UE, that the UE is entering the range of the AP.

15. The apparatus of claim 13, wherein the processing circuitry is further configured to provide an indication, based on the positional and movement information of the UE, for the UE to scan for the AP in response to a determination the UE is near to or within the range of the AP.

16. The apparatus of claim 13, wherein the processing circuitry is further configured to:

encode, for transmission to the AP, based on the positional and movement information of the UE, to add synchronization sequences to a Physical Layer (PHY) frame, and in response to a determination that no additional UEs are within the range of the AP, use a shortened synchronization sequence for future frames.

17. The apparatus of claim 13, wherein the processing circuitry is further configured to encode, for transmission to the AP based on dynamics of the UE, an indication to adjust a number of training symbols in time and frequency in a Physical Layer (PHY) frame to decrease the number of training symbols for low mobility users and increase the number of training symbols with increasing mobility.

18. The apparatus of claim 17, wherein the processing circuitry is further configured to:

introduce the training symbols into a first frame, reduce a frequency of the training symbols once the UE has gained access to the AP, and indicate, to the UE, replacement of the training symbols that have been reduced by user data information.

19. A non-transitory computer-readable storage medium that stores instructions for execution by one or more processors of an artificial intelligence (AI) service access point (SAP), the one or more processors to configure the AI SAP to, when the instructions are executed, control behavior of at least one of an Access Point (AP) or user equipment (UE), the one or more processors further configure the AI SAP to, when the instructions are executed:

expose an AI model in the AI SAP to external network entities in at least one wireless system through reception of context information from information functions of external network entities;

process the context information in addition to non-context information provided by other entities in the AI SAP to initially derive the AI model, and subsequently revise the AI model and determine a response for adjustment of at least one of the AP or UE based on external policies that comprise mobile network operator (MNO) policies;

generate the response for transmission to the at least one of the AP or UE; and perform AI-based predictive quality of service (QOS) management by analyzing real-time and historical context information comprising at least radio access technology (RAT) presence, QoS metrics, and UE mobility, and to adapt AP activation and Physical Layer (PHY) frame based on predicted UE behavior.

20. The medium of claim 19, wherein the one or more processors further configure the AI SAP to, when the instructions are executed:

encode, for transmission to the AP, based on positional and movement information of the UE, to add synchronization sequences to a PHY frame, and in response to a determination that no additional UEs are within a range of the AP, use a shortened synchronization sequence for future frames, and encode, for transmission to the AP based on dynamics of the UE, an indication to adjust a number of training symbols in time and frequency in the PHY frame to decrease the number of training symbols for low mobility users and increase the number of training symbols with increasing mobility.

* * * * *